United States Patent
Sukhwani et al.

(10) Patent No.: US 12,172,323 B2
(45) Date of Patent: Dec. 24, 2024

(54) METHOD AND SYSTEM FOR DETECTING ANOMALIES IN A ROBOTIC SYSTEM

(71) Applicant: ABB Schweiz AG, Baden (CH)

(72) Inventors: Mohak Sukhwani, Benares (IN);
Divyasheel Sharma, Bangalore (IN);
Sudarshan M V, Bangalore (IN);
Prabhat Shankar, Bangalore (IN);
Aravindhan Gk, Chennai (IN)

(73) Assignee: ABB Schweiz AG, Baden (CH)

( * ) Notice: Subject to any disclaimer, the term of this patent is extended or adjusted under 35 U.S.C. 154(b) by 574 days.

(21) Appl. No.: 17/419,474

(22) PCT Filed: Dec. 5, 2019

(86) PCT No.: PCT/IB2019/060464
§ 371 (c)(1),
(2) Date: Jun. 29, 2021

(87) PCT Pub. No.: WO2020/141372
PCT Pub. Date: Jul. 9, 2020

(65) Prior Publication Data
US 2022/0118619 A1    Apr. 21, 2022

(30) Foreign Application Priority Data

Dec. 31, 2018  (IN) .............................. 201841050077

(51) Int. Cl.
*B25J 9/16*    (2006.01)
*B25J 11/00*   (2006.01)

(52) U.S. Cl.
CPC ............. *B25J 9/1674* (2013.01); *B25J 9/161* (2013.01); *B25J 9/163* (2013.01); *B25J 9/1653* (2013.01); *B25J 9/1664* (2013.01); *B25J 11/0075* (2013.01)

(58) Field of Classification Search
CPC ........ B25J 9/1674; B25J 9/161; B25J 9/1653; B25J 9/1664; B25J 11/0075
See application file for complete search history.

(56) References Cited

U.S. PATENT DOCUMENTS

| 2008/0114492 A1 * | 5/2008 | Miegel ............... B25J 9/1664 901/6 |
| 2012/0123737 A1 * | 5/2012 | Hansen ............. H01L 21/67288 702/183 |

(Continued)

FOREIGN PATENT DOCUMENTS

| WO | WO-2008085705 A1 * | 7/2008 | ........... C10G 11/187 |
| WO | 2009/046199 A1 | 4/2009 | |
| WO | WO-2017120579 A1 * | 7/2017 | ........... G05B 13/027 |

OTHER PUBLICATIONS

Indian Patent Office, International Search Report for IN201841050077, Aug. 18, 2020, 6 pages.

(Continued)

*Primary Examiner* — Stephen Holwerda
*Assistant Examiner* — Tristan J Greiner
(74) *Attorney, Agent, or Firm* — Leydig, Voit & Mayer, Ltd.

(57) ABSTRACT

The present invention relates to a method and a system for detecting anomalies in a robotic system in an industrial plant. The robotic system is associated with a computing system configured to detect an anomaly in the robotic system. The computer system monitors configuration parameters of the robotic system and process parameters associated with the robotic system. Further, the computing system detects an association between at least one configuration parameter and at least one process parameter for obtaining optimal configuration parameters and optimal process parameters. The optimal configuration parameters and optimal process parameters are analyzed for detecting (Continued)

an anomaly. At least one parameter among the configuration parameters and the process parameters is identified causing the anomaly. Thereafter, the detected anomaly is validated, valid setpoint is estimated and the estimated valid setpoint is updated in the analytics model. The updated analytics model is subsequently used to detect anomaly accurately.

10 Claims, 5 Drawing Sheets

(56) References Cited

U.S. PATENT DOCUMENTS

| | | | |
|---|---|---|---|
| 2015/0283702 A1* | 10/2015 | Izhikevich | B25J 9/163 |
| | | | 700/257 |
| 2017/0364076 A1* | 12/2017 | Keshmiri | G05B 19/41 |
| 2020/0103886 A1* | 4/2020 | Gandenberger | G05B 23/0283 |

OTHER PUBLICATIONS

European Patent Office, International Search Report for PCT/IB2019/060464, Mar. 26, 2020, 3 pages.
European Patent Office, Written Opinion for PCT/IB2019/060464, Mar. 26, 2020, 7 pages.

* cited by examiner

METHOD AND SYSTEM FOR DETECTING ANOMALIES IN A ROBOTIC SYSTEM

CROSS-REFERENCE TO RELATED APPLICATIONS

This application is a U.S. national stage of International Application Serial No. PCT/IB2019/060464, filed Dec. 5, 2019, which claims priority to Indian patent application Ser. No. 20/184,1050077, filed Dec. 31, 2018. The entire disclosures of both of the foregoing applications are incorporated herein by reference.

TECHNICAL FIELD

The current invention relates in general to industrial robots and more particularly to detect anomalies efficiently in a robotic system in an industrial plant.

BACKGROUND

Industrial robots are widely used for varied applications, for example, automotive paint industries to supply chain management. A robotic system can include a robotic arm, a controller, and a computer. Generally, the robotic paint system is associated with a process equipment (e.g., a pump to supply paint to the robotic arm) for performing an operation (apply paint on a vehicle, pick and place an object, and the like).

In a typical industrial plant, the process equipment and the robotic system are monitored by an operator in the industrial plant, and specific parameters which are likely to cause an anomaly are flagged. Further, if the operator detects a parameter causing an unusual effect in the operation, such parameter is also flagged. The flagged parameters are analyzed using a model and an anomaly is detected. However, such models are built for specific parameters and when a new parameter is used, the existing model cannot be used. Further, manually generating a model for different parameters is a tedious task. Further, the plant operators may not be aware of the working of the model, therefore the plant operators cannot precisely select the parameters that have to uploaded for analysis.

Generally, the analytics model is implemented in a server local to the industrial plant or in a remote server (cloud server). Typically, the analytics model requires raw data for monitoring and analysis. Usually, the plant operator selects all the raw data for uploading to the server. Therefore, huge data storage is required to store the raw data, thereby increasing cost of operating the industrial plant.

Often times, the plant operator may require the analytics model to be updated due to change in parameters in the industrial plant. However, third-party vendors may not be available to update the model. Also, huge costs are associated with updating the models.

In view of the above, there is a need to address at least one of the abovementioned limitations and propose a method and system to overcome the abovementioned problems.

SUMMARY OF THE INVENTION

In an embodiment the present invention relates to a method and a system for detecting anomalies in a robotic system in an industrial plant. The robotic system can comprise at least one robot and one or more controllers for controlling the at least one robot to perform an operation on an object. The one or more controllers can be a part of a Distributed Control System (DCS) configured in the industrial plant. The DCS can comprise one or more sensors to measure configuration parameters of the at least one robot and process parameters associated with the robotic system. The DCS further comprises a database to store the measured configuration parameters and the process parameters. The robotic system is associated with a computing system configured to detect an anomaly in the robotic system. The computer system monitors configuration parameters of the at least one robot and process parameters. In an embodiment, the configuration parameters and the process parameters are obtained from the one or more sensors. Further, the computing system detects an association between at least one configuration parameter and at least one process parameter for obtaining optimal configuration parameters and optimal process parameters. The optimal configuration parameters and optimal process parameters are analysed by the computing system for detecting an anomaly. At least one parameter among the configuration parameters and the process parameters is identified causing the anomaly. Thereafter, the detected anomaly is validated from a plant operator. Based on the validation, an error in the analysis is determined. The error indicates that a setpoint associated with the at least one parameter is invalid. A valid setpoint is estimated thereafter and the estimated valid setpoint is updated in the analytics model. The updated analytics model is subsequently used to detect anomaly for the at least one parameter.

In one embodiment, the configuration parameters comprise data related to applicator settings of the at least one robot, path traversed by the at least one robot and dimensions of the applicator. In one embodiment, the process parameters comprise data related to pattern of movement of the at least one robot, dimensions of the object, one or more substances required for the process and parameters related to the operation to be performed on the object.

In an embodiment, the computing unit uses machine learning techniques to determine optimal configuration parameters and optimal process parameters. In an embodiment, the detected anomaly is presented to the plant operator. The plant operator validates the detected anomaly. In one embodiment, the plant operator validates the detected anomaly as one of "successful" or "unsuccessful".

In one embodiment, for each parameter identified resulting in an anomaly, a corresponding analytics model is generated and is stored in a memory. When one of the identified parameters is subsequently used, the corresponding analytics model is used for detecting anomaly for that parameter. In an embodiment, a single analytic model can be stored, and the single analytic model is updated for each identified parameter causing the anomaly.

Systems of varying scope are described herein. In addition to the aspects and advantages described in this summary, further aspects and advantages will become apparent by reference to the drawings and with reference to the detailed description that follows.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

The present invention discloses a method and a system for detecting anomalies in a robotic system.

Figure 1:
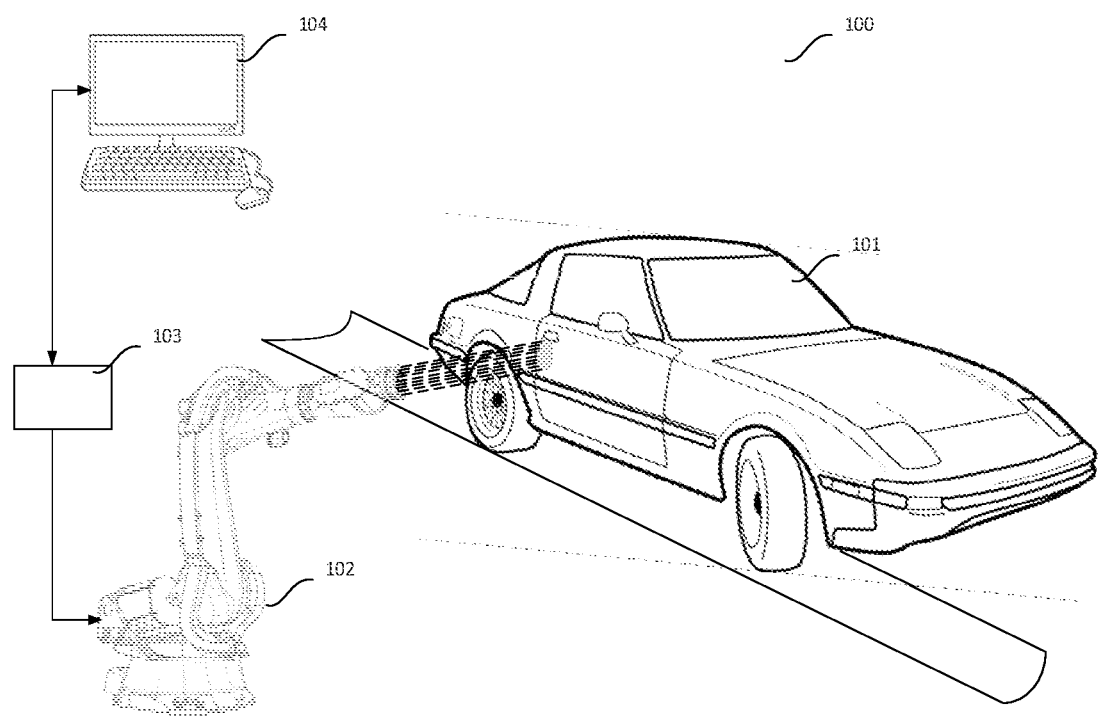
FIG. 1 illustrates a simplified block diagram of a robotic system in an industrial plant, in accordance with an embodiment of the present disclosure.

FIG. 1 shows a simplified diagram of a paint shop (100) in an industrial plant. In an embodiment a process plant can be considered in place of the industrial plant. The foregoing disclosure is described with respect to the industrial plant. However, it should not be construed as a limitation. A person of ordinary skill in the art will appreciate that aspects which are applicable to the process plant fall within the scope of this invention. The invention is described for a paint shop (100). The invention is not limited to the paint shop (100), and the invention finds application in various industrial plants and process plants. The paint shop (100) comprises a robotic system to automatedly paint an object. For example, in an automotive industry, robots are used to paint vehicles. The robots are programmed to apply specific amount of paint to specific regions of the vehicle. As seen in FIG. 1, the paint shop (100) comprises a vehicle (101), at least one robot (102), a controller (103) and a computing system (104). The vehicle (101) is placed in the paint line where the at least one robot (102) is configured to spray paint on the vehicle (101). In an exemplary embodiment, the at least one robot (102) can be a robotic arm having an applicator configured to spray paint.

The controller (103) is configured to control the robotic arm (102). The controller (103) receives one or more inputs and adjusts its outputs to operate the robotic arm (102) is a desired way. The controller (103) can be capable of controlling each part of the robotic arm (102). For example, the controller (103) can operate the robotic arm (102) to move in a particular direction. In another example, the controller (103) can operate the applicator (not shown in FIG. 1) of robotic arm (102) to tilt and spray paint with a particular air pressure.

The computing system (104) is configured to analyse configuration parameters and process parameters. The configuration parameters are parameters related to the configuration of the robotic arm (102). For example, the configuration parameters can include applicator settings, brush size, path traversed by the robotic arm (102) to spray paint on the vehicle (101). The process parameters can include air pressure, pump settings, paint characteristics, vehicle (101) dimensions, robotic arm (102) movement pattern, and the like. In on embodiment, the computing system (104) comprises an analytics model to study characteristics of the configuration parameters and process parameters. Also, anomalies in the configuration parameters and process parameters are detected using the analytics model.

Figure 2A:
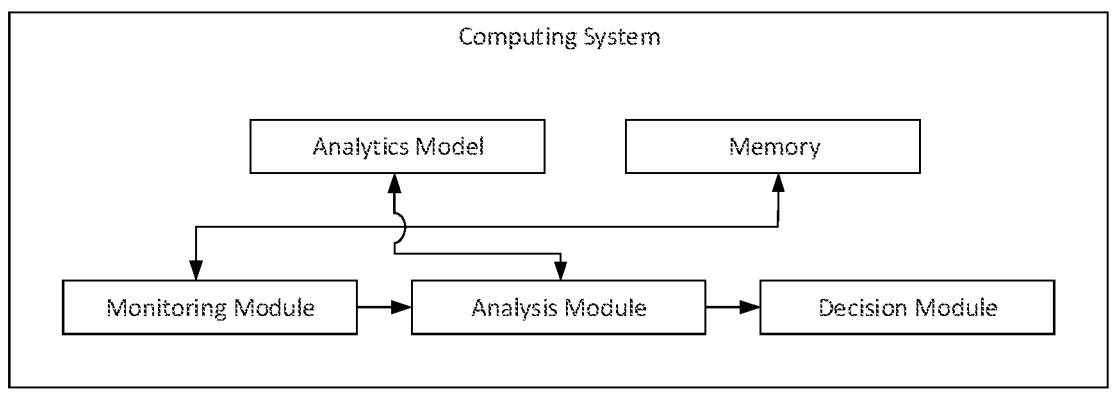
FIG. 2A illustrates block diagram of conventional set-up for detecting anomalies in a robotic system.

FIG. 2A shows a conventional computing system. As shown, the conventional computing system comprises an analytics model, a memory, a monitoring module, an analytics module and a decision module. The monitoring module is configured to monitor the configuration parameters and the process parameters. The conventional approach stores all the configuration parameters and process parameters for analysis. The configuration parameters and the process parameters are raw data which consume huge storage space. Hence, storing such huge amount of data results in high cost and additional resources. Further, the conventional approaches have one analytics model built for analyzing the configuration parameters and the process parameters. The analysis module makes use of the single analytics model to analyse the configuration parameters and the process parameters. The single analytics model is built for specific configuration parameters and the process parameters. Therefore, if one of the configuration parameters and the process parameters are changed, the analytics model cannot be used. Many a times, the existing approaches results in false alarms due to inaccurate anomaly detection. Often, the plant operator has to reset the setpoints in the computing system to avoid false alarms.

Figure 2B:
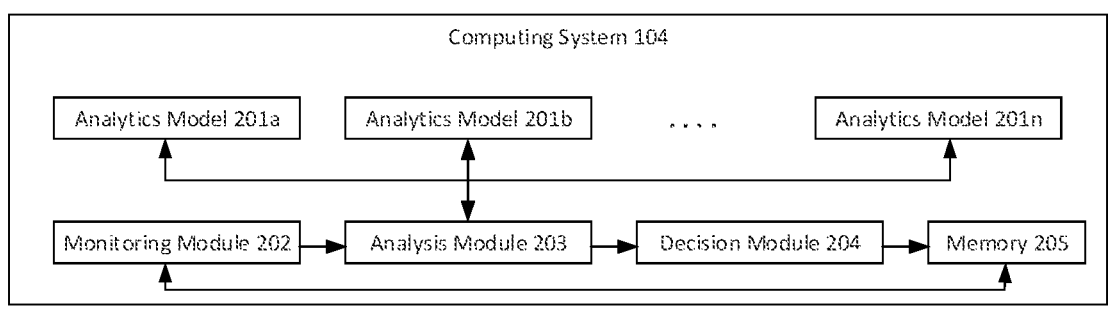
FIG. 2B illustrates an exemplary block diagram for detecting anomalies in a robotic system, in accordance with an embodiment of the present disclosure.

FIG. 2B shows proposed computing system for detecting anomalies accurately in the robotic system. The proposed computing system (104) comprises a monitoring module (202), an analysis module (203) a decision module (204), a memory (205) and one or more analytics models (201a, . . . 201n).

In an embodiment, the monitoring module (202) is configured to monitor the configuration parameters and the process parameters. Further, the monitoring module is configured to detect an association between the configuration parameters and the process parameters. For example, if the applicator is not spraying the paint evenly, the monitoring module determines the plausible causes for the uneven spraying of paint by the applicator. One reason can be due to varied air pressure. Thus, the applicator being a configuration parameter and the air pressure being a process parameter, an association exists between the two. Such association is detected by the monitoring module (202) and optimal configuration parameters and the process parameters are obtained. In the example given above, the applicator data and the air pressure data can be detected as optimal configuration parameters and the process parameters. The optimal configuration parameters and the process parameters are stored in the memory (205). In one embodiment, the monitoring module (202) can use correlation analysis to determine the association between the configuration parameters and the process parameters. Likewise, any analysis can be used to detect the association.

In an embodiment, the analysis module (203) is configured to analyse the optimal configuration parameters and the process parameters. The analysis is performed to study the nature and characteristics of the optimal configuration parameters and the process parameters. The analysis module (203) can use unsupervised machine learning techniques to perform the analysis. Examples of unsupervised analysis can include, correlation analysis, dimensionality reduction of data and clustering. The nature and characteristics of the optimal configuration parameters and the process parameters are used for feature selection. The analysis module makes use of the one or more analytics model (201a . . . 201n) to perform the analysis.

For example, when analyzing an anomaly of a pump, parameters such as power, current consumption of the pump, torque output of the pump, output flow rate of paint from the pump are monitored. The analysis module (203) notices that the power consumption is correlated to torque of pump and records only either of these parameters while maintaining a correlation coefficient. The analysis module (203) then selects only paint flowrate and power consumption as main features of the pump for analysis based on variance in the parameters. If analysis module (203) notices drastic change in the variance of either parameter or the correlation coefficient this takes into revaluation of features used for analysis and reports in to the decision module (204). The decision module (204) in turn can either change the model to compute or retrain the model used for anomaly detection.

In an embodiment, each analytics model (201) is built for a specific set of configuration parameters and the process parameters. In an embodiment, the analytics model (201) is updated using machine learning techniques. In an embodiment, the analytics model (201) is a learning model which is autonomously updated based on a learning process. For example, an analytics model (201a) is built for a high viscous paint. The analytics model (201a) comprises setpoints for the viscosity of the paint. In an embodiment, if the paint is replaced by a thinner which is relatively less viscous, the analytics model (201a) can detect the change in the parameter and update the analytics model (201a) and generate a separate analytics model (201b) for the thinner. The analytics model (201b) comprises setpoints related to the thinner. Likewise, the analytics model (201) can generate a separate model for each parameter. In an embodiment, the existing analytics parameter can be updated with setpoints of the new parameters.

In an embodiment, the decision module (204) is configured to recommend actions to be performed based on the analysis. For example, the recommendations can include, identifying important parameters among the configuration parameters and the process parameters for constant monitoring, load prediction based, data related to retraining the analytics model (201), more data required for analysis, and the like. Further, the decision module (204) can recommend that the monitored data can be archived in the memory (205) for subsequent analysis. The decision module (204) can also influence changes or tune an application's monitoring set up by deciding on semantics that trigger sending data for further analysis. The trigger semantics may be configured using machine learning techniques such as change-points or anomaly detection. The decision module (204) may also rank the triggers and advise sampling data based on the relevance of a particular alarm/trigger.

In an embodiment, the computing system (104) can include but is not limited to a server, a supercomputer, a workstation, a laptop or any other electronic device capable of performing the method as described below in FIG. 3.

Figure 3:
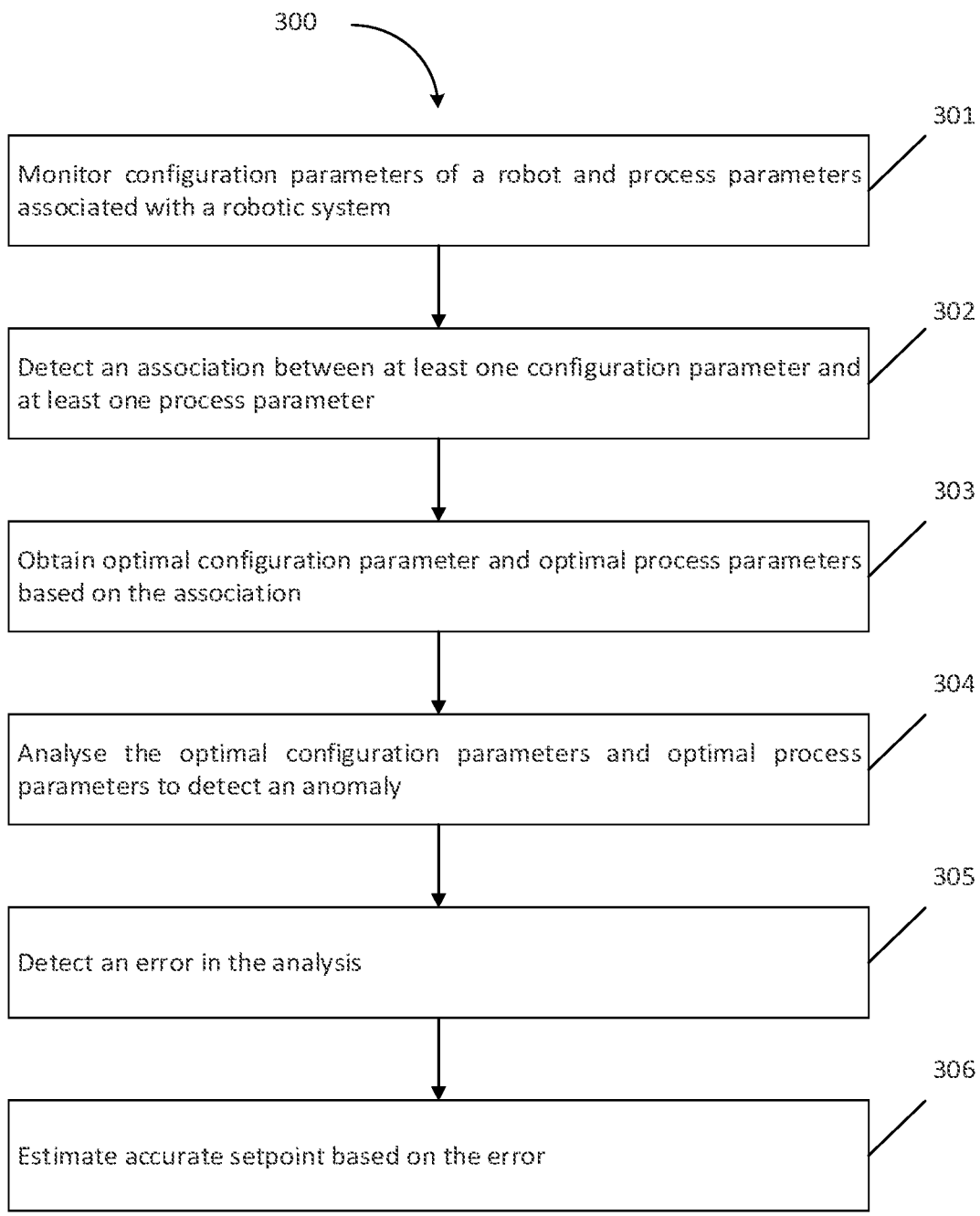
FIG. 3 illustrate an exemplary flow chart of detecting anomalies in a robotic system, in accordance with an embodiment of the present disclosure.

FIG. 3 illustrates a flowchart (300) for detecting anomalies in the industrial plant. At step 301, the computing system (104) monitors the configuration parameters and process parameters of the robotic arm (102). The monitoring module (202) monitors the configuration parameters and the process parameters of the robotic arm (102).

Figure 4:
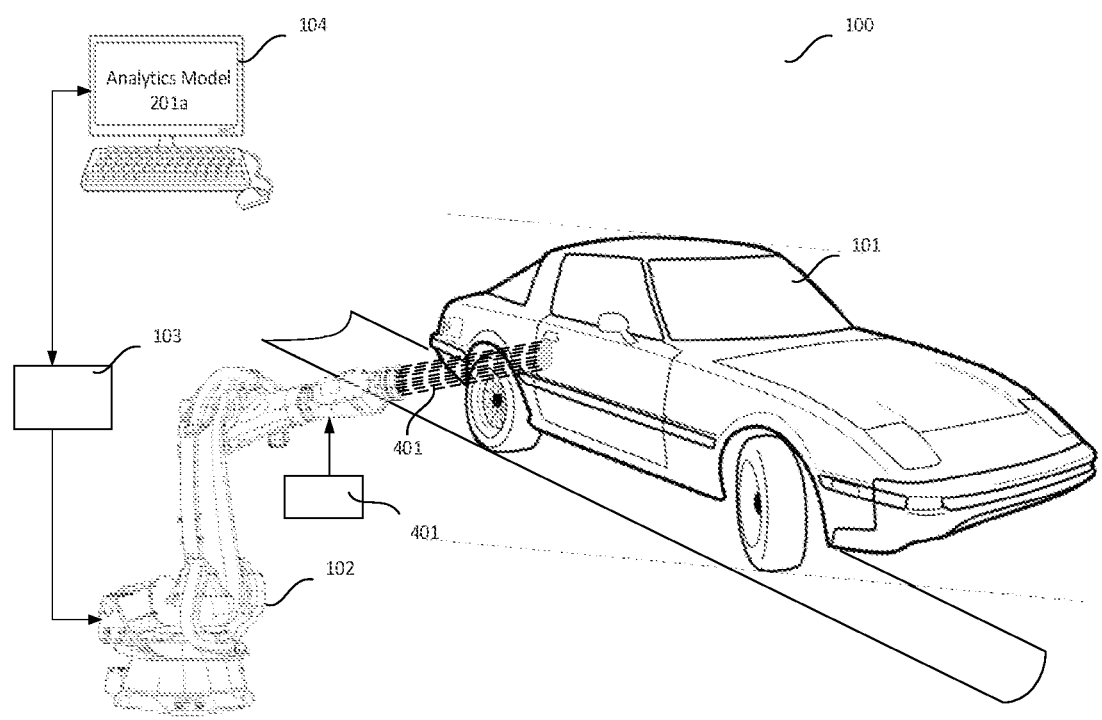
FIG. 4 and FIG. 5 illustrate exemplary scenarios of detecting anomalies in the robotic system, in accordance with an embodiment of the present disclosure.

Let us consider a first scenario where a pump stores a first liquid (paint) to be sprayed on the vehicle (101). Referring to FIG. 4, a paint shop (100) is shown. Let us consider the pump (401) comprises a liquid (paint) having a high viscosity. The pump (401) pumps the paint to the robotic arm (101) for spraying the paint on the vehicle (101). The analytics model (201a) is configured to store viscosity setpoints related to the paint. The applicator of the robotic arm (101) is sprays the paint with a certain air pressure. Referring back to FIG. 3, at step 302, the monitoring module (202) is configured to detect an association between the configuration parameters and the process parameters and at step 303, the monitoring module (202) is configured to obtain optimal configuration parameters (e.g., applicator settings) and process parameters (pump (401) characteristics) based on the association between the configuration parameters and the process parameters.

Figure 5:
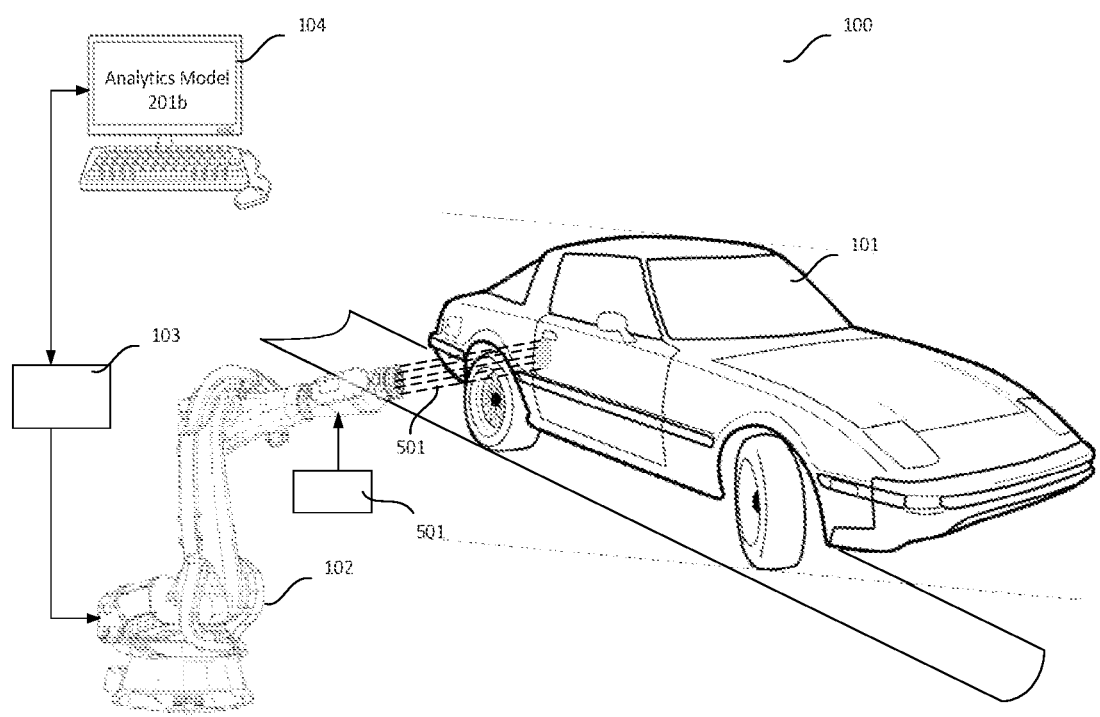

Let us now consider a second scenario where a pump stores a second liquid (thinner) to be sprayed on the vehicle (101). Referring to FIG. 5, the paint shop (100) is shown where the thinner is sprayed on the vehicle (101). In one embodiment, the thinner has relatively less viscosity compared to the paint. The pump (501) as shown in FIG. 5 pumps the thinner to the robotic arm (102) for spraying on the vehicle (101). The applicator may spray the thinner with a specific air pressure which can be different from spraying the paint. The monitoring module (202) is configured to monitor the configuration parameters and the process parameters for the robotic system as shown in FIG. 5. As indicated in step 302, the monitoring module (202) may detect an association between the air pressure of the applicator and characteristics of the pump (501). As indicated in step 303, the monitoring module obtains optimal configuration parameters and process parameters based on the association and stores in the memory (205).

At step 304, the analysis module (203) analyses the optimal configuration parameters and the optimal process parameters to detect an anomaly. Considering the first scenario, and with reference to FIG. 4, the analysis module (203) uses the analytics model (201a) for analysis. Referring back to FIG. 3, at step 304, the analysis module (203) may detect an anomaly accurately using the viscosity setpoints related to the paint. Viscosity can be considered as at least one parameter causing the anomaly.

Considering the second scenario and with reference to FIG. 5, the analysis module (203) the analysis module (203) uses the analytics model (201a) for analysis. Referring back to FIG. 3, as indicated in step 304, the analysis module (203) cannot detect an anomaly accurately using the viscosity setpoints related to the paint. Further, an anomaly is detected can result in a false alarm as the viscosity setpoints for the thinner can be different from the viscosity setpoints of the paint. As the analytics model (201a) is specific to paint, using the analytics model (201a) for analyzing the thinner parameters cannot result in accurate analysis. Thus, upon detecting the anomaly, the anomaly is validated by the plant operator. For example, a display unit associated with the computing system (104) can display the anomaly to the plant operator. The plant operator can validate the anomaly by inputting one of "successful" or "unsuccessful". A person skilled in the art will appreciate that validation can be performed in different ways and may not be limited to the technique as described in the present invention. If the operator has validated the anomaly as "unsuccessful", the analysis module (203) detects an error by comparing the output of the first scenario and the output of the second scenario, as indicated in step 305 of FIG. 3. The error can be used to determine that the setpoints used are invalid. At step 306, valid setpoints are estimated for the thinner. In one embodiment, the valid setpoints can be estimated using historical data related to the thinner. In another embodiment, the plant operator can input the valid setpoints for the thinner. In an embodiment, the analytics model (201a) can be updated with the valid setpoints related to the thinner. For subsequent analysis, the analytics model (201a) can be used to analyse the parameters related to the thinner. In another embodiment, a new analytics model (201b) related to the thinner can be generated. The new analytics model (201b) can be stored in the memory (205). When the thinner is used in the robotic system, the analytics model (201b) can be used to analyse parameters related to the thinner.

In an embodiment, a plurality of analytics models (201a . . . 201n) can be generated using machine learning techniques. In an embodiment, updating the analytics model (201) or generating new analytics model (201) using machine learning techniques increases accuracy in detecting anomalies in the robotic system. Further, plant operator interaction with the analytics model (201) is reduced.

In an embodiment, the valid setpoints are estimated by the decision module (204).

The decision module (204) can be connected to a network which may be local to the industrial plant or can be remote to the industrial plant. The decision module (204) can obtain data related to the thinner from a different industrial plant. The obtained data can be used to update the analytics model (201a) or generate the new analytics model (201b).

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERRAL NUMERALS

101—Vehicle/object;
102—Robotic arm;
103—Controller;
104—Computing system;
201—Analytics model;
202—Monitoring module;
203—Analysis module;
204—Decision module;
205—Database;
401—First pump;
501—Second pump.

We claim:

1. A method of detecting anomalies in a robotic system in an industrial plant, wherein the robotic system comprises at least one robot and one or more controllers of a Distributed Control System (DCS), configured to control the at least one robot to perform an operation on an object, wherein the DCS comprises an analytics model to detect anomalies in the robotic system for predefined configuration parameters of the at least one robot and predefined process parameters associated with the robotic system, the method comprises:

monitoring configuration parameters of the at least one robot and process parameters associated with the robotic system, wherein the configuration parameters are a physical parameter or variable of the at least one robot and are one of, or obtained from at least one of, one or more sensors of the DCS and a database associated with the DCS, and wherein the process parameters are a parameter or variable of the operation the robot is configured to perform;

detecting an association between at least one configuration parameter and at least one process parameter;

obtaining optimal configuration parameters and optimal process parameters based on the association, wherein the optimal configuration parameters and the optimal process parameters are analyzed for detecting an anomaly by the analytics model selected based on the obtained optimal configuration parameters and/or the obtained optimal process parameters, wherein at least one parameter is identified from the optimal configuration parameter and the optimal process parameters causing the anomaly, wherein the anomaly is validated by a plant operator;

determining an error in the analysis based on the validation, wherein the error is indicative of invalid setpoints for the at least one parameter;

estimating a valid setpoint for the at least one parameter based on the error, wherein the valid setpoint is updated in the analytics model, wherein the updated analytic model is used for detecting anomalies accurately; and controlling the at least one robot to perform the operation on the object based on the valid setpoint as an input to the one or more controllers.

2. The method as claimed in claim 1, wherein the configuration parameters comprise at least data related to applicator settings of the at least one robot, a path traversed by the at least one robot, and dimensions of the applicator.

3. The method as claimed in claim 1, wherein the process parameters comprise data related to a pattern of movement of the at least one robot, dimensions of the object, one or more substances required for the process, and parameters related to the operation to be performed on the object.

4. The method as claimed in claim 1, wherein the optimal configuration parameters and the optimal process parameters are obtained using machine learning techniques.

5. The method as claimed in claim 1, wherein the updated analytics model corresponding to the at least one parameter is stored in a memory of the DCS, wherein the memory comprises an analytics model corresponding to each of a plurality of at least one parameter, wherein based on the at least one parameter, corresponding analytics model is used for detecting anomaly.

6. A computing system for detecting anomalies in a robotic system in an industrial plant, wherein the robotic system comprises at least one robot and one or more controllers of a Distributed Control System (DCS), configured to control the at least one robot to perform an operation on an object, wherein the computing unit comprises an analytics model to detect anomalies in the robotic system for predefined configuration parameters of the at least one robot and predefined process parameters associated with the robotic system, wherein the computing unit comprises:

a processor configured to:

monitor configuration parameters of the at least one robot and process parameters associated with the robotic system, wherein the configuration parameters are a physical parameter or variable of the at least one robot and are one of, or obtained from at least one of, one or more sensors of the DCS and a database associated with the DCS, and wherein the process parameters are a parameter or variable of the operation the robot is configured to perform;

detect an association between at least one configuration parameter and at least one process parameter;

obtain optimal configuration parameters and optimal process parameters based on the association, wherein the optimal configuration parameters and the optimal process parameters are analyzed for detecting an anomaly by the analytics model selected based on the obtained optimal configuration parameters and/or the obtained optimal process parameters, wherein at least one parameter is identified from the optimal configuration parameter and the optimal process parameters causing the anomaly, wherein the anomaly is validated by a plant operator;

determine an error in the analysis based on the validation, wherein the error is indicative of invalid setpoints for the at least one parameter;

estimate a valid setpoint for the at least one parameter based on the error, wherein the valid setpoint is updated in the analytics model, wherein the updated analytic model is used for detecting anomalies accurately; and control the at least one robot to perform the operation on the object based on the valid setpoint as an input to the one or more controllers, and a memory configured to store the updated analytics model, the optimal configuration parameters and the optimal process parameters.

7. The computing unit as claimed in claim 6, wherein the processor is configured to implement machine learning techniques to obtain the optimal configuration parameters and the optimal process parameters.

8. The computing unit as claimed in claim 6, wherein the computing unit is associated with a User Interface (UI), wherein the UI enables the plant operator to validate the analyzed anomaly.

9. The computing unit as claimed in claim 6, wherein the memory comprises an analytics model corresponding to each of a plurality of at least one parameter, wherein based on the at least one parameter, corresponding analytics model is used for detecting anomaly.

10. The method as claimed in claim 1, wherein obtaining the optimal configuration parameters and the optimal process parameters is further based on detecting the at least one configuration parameter of the association as the optimal configuration parameters, and detecting the at least one process parameter of the association as the optimal process parameters.

* * * * *